United States Patent Office 2,898,271
Patented Aug. 4, 1959

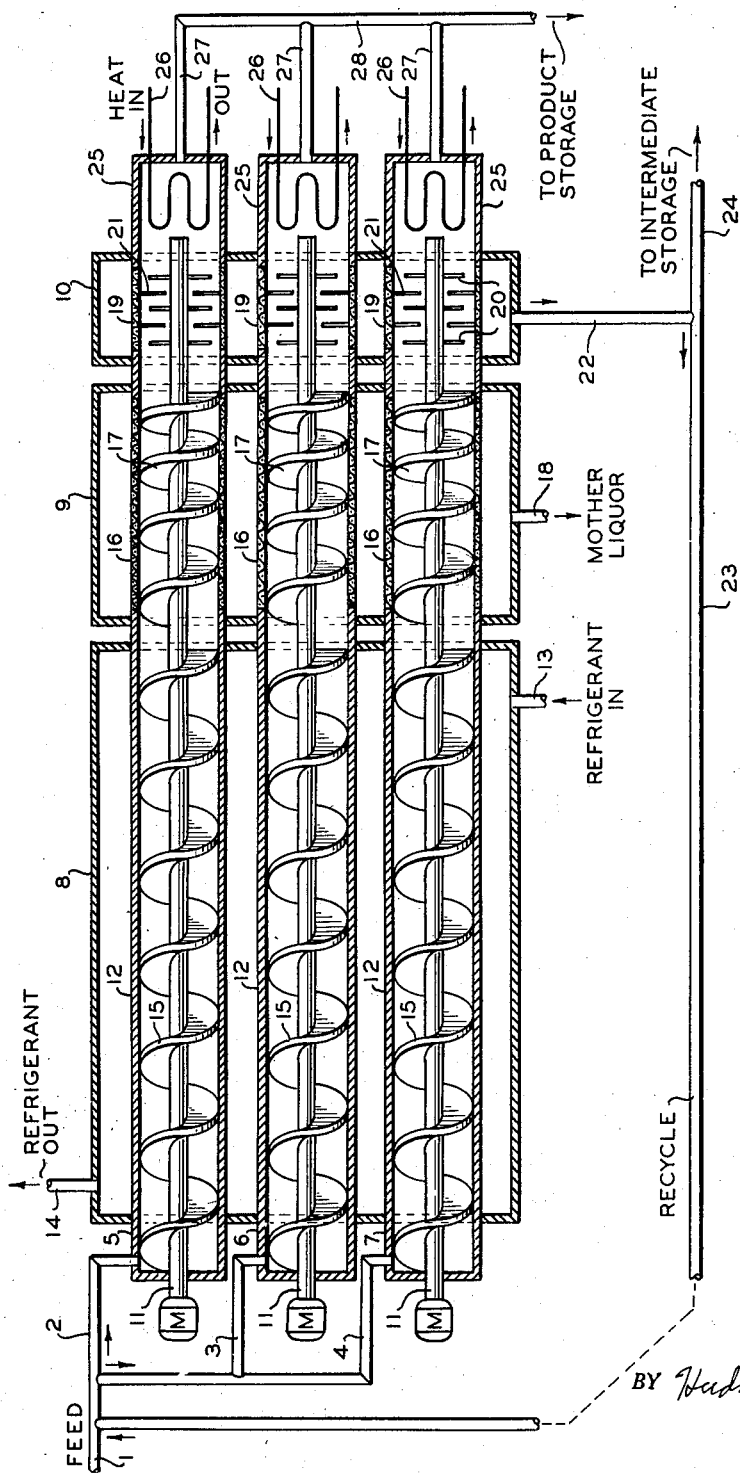
FIG. I
INVENTOR.
R. A. FINDLAY
BY Hudson & Young
ATTORNEYS

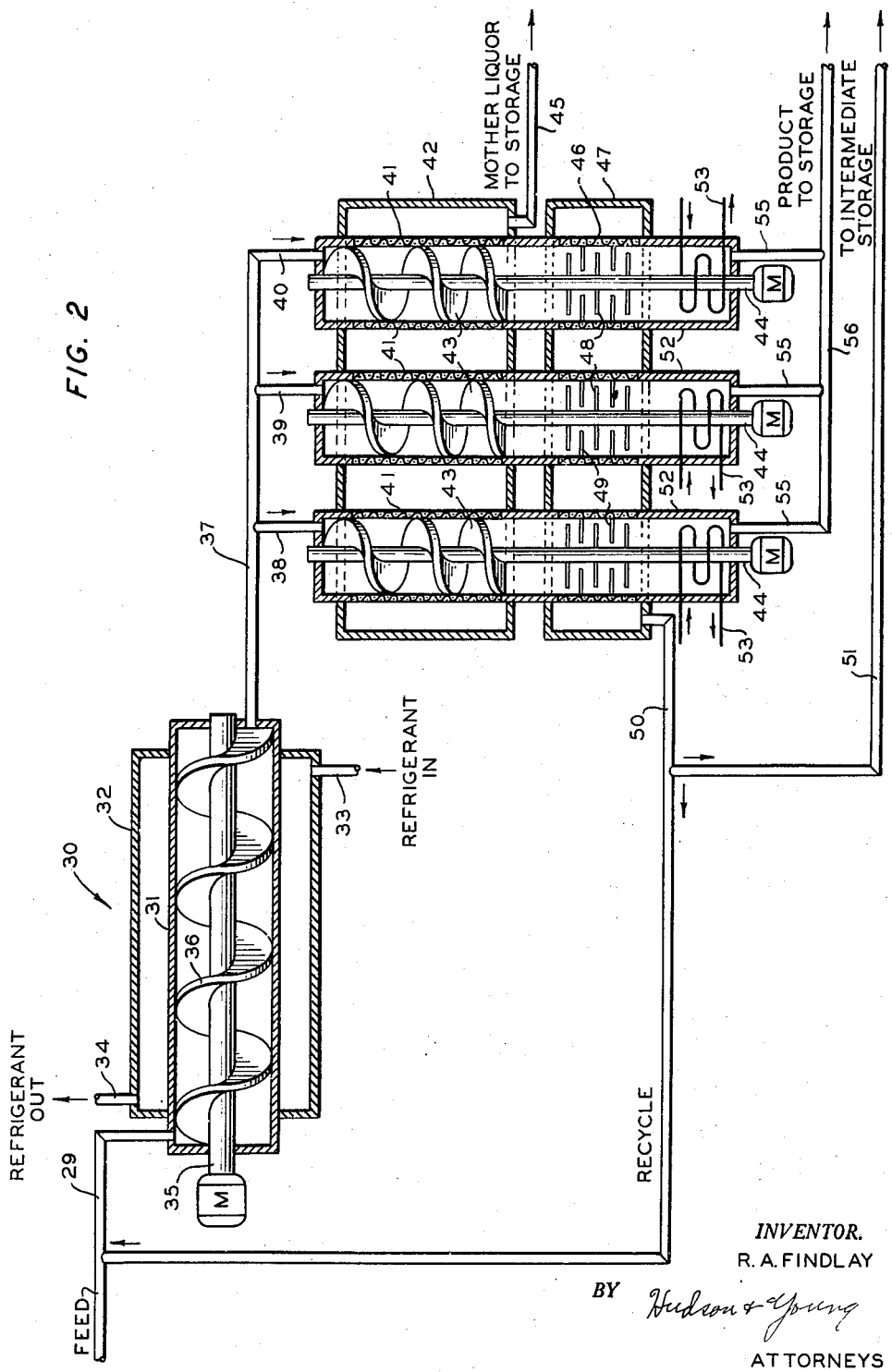

2,898,271

CRYSTAL PURIFICATION APPARATUS

Robert A. Findlay, Bartlesville, Okla., assignor to Phillips Petroleum Company, a corporation of Delaware Application July 6, 1954, Serial No. 441,571

6 Claims. (Cl. 196—14.5)

This invention relates to an apparatus and method for separation and purification of a liquid mixture by crystallization. In one of its aspects, it relates to crystal separation and purification method wherein the crystalline material is of a waxy consistency. In another aspect, this invention relates to an apparatus suitable for separation of hydrocarbons by crystallization wherein the crystal forming hydrocarbons form wax-like crystals.

It is well known that mixtures of liquids, or solutions can be separated or concentrated by crystallization. That is the higher melting material can be frozen and separated from the liquid portion by filtration or other suitable methods. For example, solutions and emulsions can be concentrated by freezing the solvent or liquid component and hydrocarbons can be separated by freezing one or more constituents.

In separating the liquid and solid phases, there is no problem when the solid phase consists of granular crystals such separation being easily accomplished by means of filtering or centrifuging. However, if the solid phase has a wax-like consistency, the solid material blocks the pores in the filter or centrifuge screen and effectively blocks filtering or materially increases filtering time. Filter aids are not entirely satisfactory and where it is desirable to recover the solid phase, a subsequent separation step is required. Handling such waxy crystals or materials by "squeeze" methods using a piston is difficult because they tend to stick together in a non-porous plug. Use of a screw conveyor is equally difficult because the crystals tend to stick to the screws instead of moving forward.

I have found that by using a plurality of small diameter columns each comprised of a scraped chiller or crystallizer tube, a screw of decreasing pitch turning in a porous cylinder, a stirred crystal purification column, and a melt zone respectively in series and operatively connected one to the other, such waxy materials can be effectively separated and purified. I have also found that a plurality of filter columns of small cross sectional area have a higher capacity for wax-like materials than does a single large column of the same total cross sectional area.

An object of this invention is to provide an apparatus suitable for separating and purifying substances by crystallization wherein the crystallizing component forms crystals having a wax-like consistency.

Another object of this invention is to provide an apparatus for separating and purifying hydrocarbons by crystallization wherein the crystallizing component forms wax-like crystals.

Still another object of this invention is to provide a method of separating and purifying organic compounds by crystallization wherein the crystallizing components form crystals having a wax-like consistency.

Other objects and advantages of this invention will be apparent to those skilled in the art upon reading this disclosure and the attached claims.

My invention is especially useful in separating and purifying substances which form wax-like crystals. Examples of such separations include separating a normal $C_6$ to $C_{16}$ paraffinic hydrocarbon from other close-boiling hydrocarbons, 2-methyl-5-vinyl pyridine from other pyridines such as 5-ethyl-2-methyl pyridine, naphthalene from other hydrocarbons, butanediol from admixtures, the high lubrication oils from petroleum fractions and anthracene from other hydrocarbons.

My invention can best be described by referring to the attached drawings in which:

Figure 1 is a sectional view of an embodiment of my apparatus wherein a plurality of crystallizing zones are used and the entire apparatus is horizontal, and Figure 2 is a cross sectional view of my apparatus wherein a single crystallizing zone is used and the filtering and purification sections are vertical.

Referring to the Figure 1, a feed conduit 1 connects with a plurality of conduits 2, 3 and 4 which in turn connect with tubes 5, 6 and 7 respectively. Each of these tubes pass through chambers 8, 9 and 10 which will be later defined. Since the structure of each of these tubes 5, 6 and 7 is identical, only one such tube will be described. Journaled in each tube is a power driven rotatable shaft 11. That portion of the tube in chamber 8 is a crystallizing zone 12. A coolant or refrigerant inlet 13 and a refrigerant outlet 14 is provided in chamber 8. Attached to shaft 11 is a scraper means 15 which is so designed as to scrape the interior walls of the tube throughout the crystallizer section 12. This scraper means is shown as a spiral screw, however, a spiral ribbon, scraper bars, or any other scraper means can be employed. That portion of the tube passing through chamber 9 is a filtering section 16. That is, the wall of the tube is porous. One method of constructing such a section is to have a plurality of outlets drilled in said tubes and covering said outlets with a filter cloth or screen and preferably covering said outlets from the inside of the tube. Means for backwashing said screen can be provided if so desired. Attached to said journaled shaft in this filtering section is a screw conveyor 17 of decreasing pitch from the inlet to the outlet end thereof. Conduit 18 is provided in chamber 9 for withdrawing liquid (mother liquor). That portion of the tube passing through chamber 10 is the purification section 19. The walls of the tube in this section, like the walls in section 16 are provided with filtering means. This section is also provided with agitation means such as stirrers 20 attached to shaft 11 and rods 21 attached to the tube wall. The shafts are shown as passing only through this section in which case they will be journaled in a bearing supported from the walls of the tubes. It is within the scope of this invention to journal the bearing at the end of the tube and to drive the shaft from this end. Chamber 10 is provided with an outlet conduit 22 which in turn connects with recycle conduit 23 and storage conduit 24. The final section of the tube or melt section 25 is provided with means for heating such as heat exchanger conduits 26. Outlet conduits 27 are provided in this end of tubes 5, 6 and 7 which in turn connect to storage conduit 28.

In describing this apparatus, the crystallizer sections 12 are shown as the same diameter as are filtering sections 16. Since this crystallizer section will contain the crystals in a slurry with the uncrystallized material, there will be no problem of conveying the slurry through these sections. These sections can be equal or larger in diameter than are the filtering sections. As has been indicated, I have found that the throughput per unit of cross sectional area of a filtering section is greater for the smaller diameter tubes. The minimum size tube will be controlled by construction limitations. I prefer to use a diameter for my filtering section of two to six inches. Zone 16, 19 and 25 can be mounted vertically if so desired. The operation of such vertical arrangement will be described in connection with the discussion of Figure 2.

Another embodiment of my invention is illustrated in Figure 2. In this embodiment of my invention, feed conduit 29 feeds tube 31 of crystallizer 30. This crystallizer is comprised of a cylindrical shell 31 jacketed in annular jacket 32. This annular jacket is provided with inlet conduit 33 and outlet conduit 34 for refrigerant circulation. Journaled shaft 35 is driven by a power means such as motor M. Attached to shaft 35 are scrapers illustrated by screw 36 which scrape the interior walls of tube 31 as shaft 35 rotates. The tube 31 is provided with an outlet conduit 37 which in turn is connected via conduits 38, 39 and 40 to the plurality of filters 41. These filters are mounted in a common housing 42. The walls of these filtering sections are comprised of filtering means and a screw 43 of decreasing pitch, from inlet to outlet, turns in each of these sections. These screws are attached to journaled shafts 44 which are in turn rotated by a power means such as motor M. The common housing 42 is provided with an outlet conduit 45.

The filters 41 are in free communication with filter-purifiers 46. These purifiers pass through a common housing 47. These purifier walls are provided with filtering means. The shafts 44 pass through these purifiers. Attached to the shafts 44 in this section are a plurality of stirrers 48. Rods 49 are attached to the filter walls. Outlet conduit 50 is provided in the housing 47 for returning liquid from this section to feed conduit 29. Conduit 51 is provided to send this liquid to storage (not shown) if desired.

Disposed immediately below and in free communication with filter-purifiers 46 are melt sections 52. These melt sections are provided with heating means 53. Outlet conduits 55 are provided in each melt section and these conduits connect to conduit 56 which leads to a storage vessel (not shown).

The plurality of filters, filter-purifiers, and melt sections are shown as being mounted vertically. It is within the scope of this invention to mount these sections horizontally if so desired, or in any other desired position.

Those skilled in the art of purifying substances by crystallization will understand that, in order for the desired material to be recovered in its theoretically pure crystalline form from a liquid phase admixture with other substances, it must be present in the mixture in an amount in excess of that present in any eutectic which may be formed upon cooling the liquid mixture. It will be understood, also, that cooling such a liquid feed mixture can result in the formation of a single solid phase of theoretically pure crystals of the material to be purified, and that such crystals will continue to be formed, as the temperature of the mixture is lowered, until a temperature (characteristic of the particular system under consideration) is reached at which the formation of a second solid phase (eutectic) occurs. In general, therefore, the feed to the process of my invention must be richer in the material to be crystallized than is any eutectic capable of being formed by the system, and the temperature at the outlet of the crystallizer is preferably above the temperature at which any such eutectic is formed. With these considerations in mind, the operation of my invention will now be described with reference to Figure 1.

Referring to Figure 1, a feed stream 1 is divided into a plurality of streams 2, 3 and 4 which are in turn introduced into tubes 5, 6 and 7, respectively. At the same time a coolant is circulated through chamber 8 via conduits 13 and 14. The coolant is introduced to the chamber at such a rate and temperature as to assure the formation in crystallizers 12, of crystals of the feed component to be purified. In order to keep the walls free of crystals and thereby maintain good heat transfer and at the same time to prevent hold up, the fresh crystals are continuously scraped off of said walls by means of scraper 15. The crystals so removed form a slurry with the uncrystallized material and pass on through zone 12.

As the slurry from zone 12 passes through zone 16 the mother liquor (uncrystallized material) passes through the porous wall or screening area of the tube. At the same time, the slurry is picked up by screw conveyor 17 and is carried through this zone 16. As the material passes along this zone, the decreasing pitch of the conveyor causes the materials to be gently pressed thereby squeezing out additional mother liquor which also passes through the filtering screen. The liquid thus separated from the solids is passed via conduit 18 to storage not shown. The pressed cake leaving zone 16 and entering zone 19 is wet with mother liquor and contains mother liquor occluded therein. The cake as it enters zone 19 is contacted with a counter-current stream from melt zone 25. The stirrer blades 20 and rods 21 tend to break the cake up and insures almost complete wash by the counter-current stream. The counter-current stream displaces substantially all of the occluded impurities which pass through the screens in this zone and are discharged via conduit 22. This material can be recycled to the feed stream 1 via conduit 23 or can be sent to intermediate storage (not shown) via conduit 24.

The washed crystals pass from purification zone 19 to melt zone 25 wherein the crystals are melted by means of heat exchanger 26. Part of the melted material flows counter-current to the main stream back into zone 19 where it washes the disintegrated cake as has been described. The remaining material of high purity passes via conduit 27 to conduit 28 and on to storage not shown.

As has been indicated, the advantage of increased throughput per unit of cross sectional area is obtained in filtering. For this reason, it is possible to crystallize the feed stream in a single crystallizer and divide the slurry of crystals and mother liquor from said crystallizer into a plurality of streams and to filter and purify these plurality of streams separately. This is shown in Figure 2. The operation of each section of this arrangement is the same as was described in connection with Figure 1.

I have illustrated my invention in some of its embodiments. Pumps, valves and the like have not been shown, it being within the skill of the art to supply these as needed. Those skilled in the art will see many modifications which can be made without departing from the scope of this invention. For example, it is within the scope of this invention to provide back washing means for the various filtering screens. It is also within the scope of this invention to surround the tube in these zones with filtering means as needed. If desired, the shaft may be broken into a plurality of shafts, one in each zone, and each shaft driven by separate power means and at different rates or any other desirable combination can be used. My invention is applicable for separating liquids whenever the components to be separated out form wax-like crystals. Some such materials have been indicated.

I will further illustrate my invention by the following examples. It should be understood that these examples are typical and are not to be considered limiting in any manner.

*Example I*

A normal octane concentrate, prepared by fractional distillation of a Michigan naphtha, is fed to the crystal purification apparatus of Figure 1. The crystallizers are operated at an outlet temperature of about −80° F., and a normal octane product stream of 99.2 mol percent purity is produced. Data pertinent to stream compositions are shown in the following tabulation:

| Stream | Figure 1 Conduit | Specific Gravity | n-Octane content (Mol. percent) | Major Impurities (Mol percent) |
|---|---|---|---|---|
| Feed | 1 | 0.71145 | 87.9% | $C_8$ naphthenes 9(9–10%). |
| Mother Liquor | 22 | 0.71805 | (Est. 75%) | $C_8$ naphthenes. |
| Product | 28 | 0.70326 | 99.2% | $C_8$ naphthenes (<1%). |

*Example II*

A normal nonane concentrate, prepared by fractional distillation of a Michigan naphtha, is fed to the crystal purification apparatus of Figure 2. The crystallizer is operated at an outlet temperature of about −90° F., and a normal nonane product stream of 98.9 mol percent purity is obtained. Data pertinent to stream compositions are shown in the following tabulation:

| Stream | Figure 1 Conduit | Specific Gravity | n-Nonane content (Mol percent) | Major impurities (Mol percent) |
|---|---|---|---|---|
| Feed | 1 | 0.72666 | 88.1 | $C_9$ naphthenes (10%). |
| Mother Liquor | 22 | 0.73614 | 74.6 | $C_9$ naphthenes. |
| Product | 28 | 0.71859 | 98.9 | $C_9$ naphthenes (1%). |

In a similar manner, n-decane is purified to a purity of 98.8 mol percent or greater, n-undecane to a purity of 96.6 mol percent or greater, and other normal paraffin hydrocarbons from $C_6$ to $C_{16}$ or higher are purified to comparable degrees of purity by the process of this invention. As pointed out hereinbefore, the invention is also useful in the purification of other substances which form wax-like crystals, among these being 2-methyl-5-vinyl pyridine, naphthalene, butanediol, etc.

I claim:

1. An apparatus for separating and purifying liquid mixtures by crystallization wherein the crystallizing material forms wax-like crystals said apparatus comprising in combination at least one crystallization chamber, each said chamber having an inlet, means for scraping the internal walls of each said chamber and means for cooling each said chamber; a plurality of cylindrical filter chambers having filter means in said chamber walls for withdrawing liquid to a common collection zone, each of last said chambers having a rotatable screw journaled therein, said screw having a smoothly decreasing pitch from inlet to outlet; means for passing material from said crystallization chamber to said plurality of filtering chambers; a common housing around said plurality of filtering chambers; means for withdrawing liquid from said common housing; a plurality of purification chambers each being in free communication with the outlet of and associated with a filtering chamber, the walls of said purification chambers having filtering means for withdrawing liquid and each said purification chamber having stirring means; a common housing around said plurality of purification chambers; means for withdrawing liquid from last said common housing; a plurality of melt chambers in association with and in free communication with the plurality of purification chambers; heat exchange means in each said melting chamber; and means for withdrawing liquid from each of said melt chambers.

2. An apparatus for separating liquids by crystallization said apparatus comprising in combination a crystallizer chamber having an inlet and an outlet; means for cooling said crystallizer chamber; means for scraping the internal walls of said crystallizer chamber; a plurality of tubes in parallel; conduit means connecting the outlet of the said crystallizer chamber and the inlet of each of said plurality of tubes; a power driven shaft journaled in each of said tube; a screw of smoothly decreasing pitch from inlet of each said tube to a position intermediate the length of said tube, said screw being driven by said shaft; a fluid tight housing surrounding that portion of said plurality of tubes wherein said screw is located; filtering means in the walls of said tubes within said housing; means for withdrawing liquid from said housing; a plurality of stirrers attached to said shafts intermediate said screw and the outlet of said tube; a plurality of rods attached to walls of said tube and interspaced among said stirrers; a fluid tight housing around that portion said plurality of tubes containing said stirrers and said rods; filtering means in the walls of said tubes within last said housing; means for withdrawing liquid from last said housing; heat exchange means in each said tube intermediate said stirrers and outlet of said tubes; and outlet means in each said tube.

3. The apparatus of claim 2 wherein the plurality of tubes are mounted vertically.

4. An apparatus for separating liquids by crystallization said apparatus comprising in combination a feed source; a plurality of crystallizer chambers; conduit means for passing liquid from said feed source to each of said plurality of crystallizer chambers; means for cooling each said crystallizer chamber; means for continuously scraping the internal walls of each crystallizer chamber; each said crystallizer being associated and communicating with an associated filter chamber; said filter chamber having filtering means in the walls thereof; a rotatable screw journaled in each of said filter chambers; said screw having smoothly decreasing pitch from inlet to outlet; means for passing materials from said crystallizer chambers to said associated filter chambers; means for withdrawing fluid through said filtering means to a common housing around said filter chambers; each said filter chamber being associated with and in communication with a purification chamber; filter means in the walls of each purification chamber; stirrer means in each purification chamber; means for withdrawing liquid through the last said filter means to a common housing around said purification chambers; each said purification chamber being associated with and in communication with a melt chamber; heat exchange means in each melt chamber; means for passing liquid from each said melt chamber to said associated purification chamber; means for removal of liquid from each of said common housings; and means for withdrawing liquid from said melt chamber.

5. An apparatus for separating and purifying liquid mixtures by crystallization wherein the crystallizing material forms wax-like crystals which comprises in combination a plurality of horizontal tubes; a feed conduit; conduit means connecting said feed conduit to each of said horizontal tubes; a shaft journaled in each of said tubes; means attached to said shaft for scraping the tube walls from the tube inlet to a position intermediate the tube length; a common fluid tight housing surrounding that portion of the plurality of tubes containing the scraping means; means for circulating refrigerant through said common housing; a screw of smoothly decreasing pitch attached to each said shaft and extending from the scraping means to a position intermediate the end of said tubes; filter means in said tube walls surrounding said screw; a common fluid tight housing surrounding that portion of said plurality of tubes containing said screws; means for withdrawing liquid from said housing; a plurality of stirrers attached to said shaft extending from the end of said screw to a position intermediate the end of said tube; a plurality of rods attached to walls of the tubes surrounding said stirrers, said rods being interspaced among said stirrers; filter means in the walls of said tubes surrounding said rods and stirrers, a common housing surrounding that portion of said tubes containing said stirrers and said rods; means for withdrawing liquid from last said housing; heating means in the end portion of each said tube; and means for withdrawing liquid from the end of each said tube.

6. The apparatus of claim 5 wherein each tube of the plurality of tubes has a diameter in the range of two to six inches.

References Cited in the file of this patent

UNITED STATES PATENTS

| | | |
|---|---|---|
| Re. 23,810 | Schmidt | Mar. 30, 1954 |
| 2,241,726 | Krause | May 13, 1941 |
| 2,321,117 | Wilcock | June 8, 1943 |
| 2,324,869 | Oman | July 20, 1943 |
| 2,533,232 | Dressler | Dec. 12, 1950 |
| 2,751,890 | Rush | June 26, 1956 |
| 2,780,663 | Gunness | Feb. 5, 1957 |
| 2,791,333 | McKay | May 7, 1957 |

FOREIGN PATENTS

| | | |
|---|---|---|
| 404,354 | Italy | June 9, 1943 |